(12) United States Patent
Choi et al.

(10) Patent No.: US 10,147,545 B2
(45) Date of Patent: Dec. 4, 2018

(54) CERAMIC COMPOSITION AND MULTILAYER CAPACITOR HAVING THE SAME

(71) Applicant: SAMSUNG ELECTRO-MECHANICS CO., LTD., Suwon-si, Gyeonggi-do (KR)

(72) Inventors: Ho Sam Choi, Suwon-si (KR); Jong Ho Lee, Suwon-si (KR); Min Hoe Kim, Suwon-si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 5 days.

(21) Appl. No.: 15/289,603

(22) Filed: Oct. 10, 2016

(65) Prior Publication Data
US 2017/0287639 A1 Oct. 5, 2017

(30) Foreign Application Priority Data
Mar. 31, 2016 (KR) ........................ 10-2016-0039374

(51) Int. Cl.
*H01G 4/30* (2006.01)
*H01G 4/12* (2006.01)
(Continued)

(52) U.S. Cl.
CPC ........... *H01G 4/30* (2013.01); *C04B 35/4682* (2013.01); *H01G 2/103* (2013.01); *H01G 4/005* (2013.01); *H01G 4/1227* (2013.01); *H01G 4/228* (2013.01)

(58) Field of Classification Search
CPC ........ H01G 4/30; H01G 4/1227; H01G 4/005; H01G 4/228; H01G 2/103; C04B 35/4682
See application file for complete search history.

(56) References Cited

U.S. PATENT DOCUMENTS 4,387,112 A * 6/1983 Blach .................. G07F 7/08
283/901
5,541,248 A * 7/1996 Haluska .............. C04B 41/5096
524/405

(Continued)

FOREIGN PATENT DOCUMENTS

| JP | WO 2014147898 A1 * | 9/2014 | ............... H01G 4/30 |
| KR | 10-2010-0000730 A | 1/2010 | |
| KR | 10-2014-0031739 A | 3/2014 | |

*Primary Examiner* — David M Sinclair
(74) *Attorney, Agent, or Firm* — McDermott Will & Emery LLP

(57) ABSTRACT

A multilayer capacitor includes a capacitor body having an active region and cover layers disposed on upper and lower surfaces of the active region. The active region includes a plurality of dielectric layers and first and second internal electrodes alternately disposed with the plurality of dielectric layers interposed therebetween. The first and second internal electrodes are respectively exposed to opposite surfaces of the capacitor body. First and second external electrodes electrically are connected to the exposed portions of the first and second internal electrodes on the capacitor body, respectively. A phosphor (P) is dispersed among a non-phosphor material in the cover layers of the capacitor body. In some examples, the phosphor (P) has a content of 1 to 2 wt %, based on a total weight of a ceramic powder of the cover layers not including the phosphor (P).

11 Claims, 8 Drawing Sheets

(51) Int. Cl.
*H01G 4/228* (2006.01)
*H01G 4/005* (2006.01)
*H01G 2/10* (2006.01)
*C04B 35/468* (2006.01)

(56) References Cited

U.S. PATENT DOCUMENTS

| | | | | |
|---|---|---|---|---|
| 5,592,140 | A * | 1/1997 | Tokunaga | H01C 7/112 338/21 |
| 2004/0011997 | A1 * | 1/2004 | Rogers | C09K 11/025 252/301.4 F |
| 2005/0052878 | A1 * | 3/2005 | Yamada | C09K 11/08 362/460 |
| 2009/0002810 | A1 * | 1/2009 | Jeon | C09K 11/7734 359/361 |
| 2009/0207554 | A1 * | 8/2009 | Iguchi | H01G 2/24 361/321.2 |
| 2009/0218942 | A1 * | 9/2009 | Shirata | C09K 11/06 313/509 |
| 2016/0003737 | A1 * | 1/2016 | Shimada | H01G 4/30 361/301.4 |

* cited by examiner

CERAMIC COMPOSITION AND MULTILAYER CAPACITOR HAVING THE SAME

CROSS-REFERENCE TO RELATED APPLICATION

This application claims the benefit of priority to Korean Patent Application No. 10-2016-0039374, filed on Mar. 31, 2016 in the Korean Intellectual Property Office, the entirety of which is incorporated herein by reference.

TECHNICAL FIELD

The present disclosure relates to a ceramic composition and a multilayer capacitor having the same.

BACKGROUND

Electronic components using a ceramic material include capacitors, inductors, piezoelectric elements, varistors, thermistors, and the like.

Among ceramic electronic components, multilayer ceramic capacitors (MLCCs) have advantages such as compactness, high capacitance, and ease of mountability.

MLCCs are chip-type condensers that may be installed on the printed circuit boards (PCBs) of various electronic products such as imaging devices (or video display apparatuses) including liquid crystal displays (LCDs), plasma display panels (PDPs), and the like, as well as computers, personal digital assistants (PDAs), cellular phones, and the like, to charge or discharge electricity.

As electronic products have been reduced in size and increasingly have higher speeds, MLCCs are required to be reduced in size and increased in capacity.

Thus, in order for a chip having the same size as that of an existing chip to have higher capacity, more dielectric layers are required to be stacked, using a larger amount of high-k dielectric materials.

However, when the stacking number of dielectric layers is increased, a difference in sintering properties between an active region and a cover layer in a capacitor body may be increased.

Thus, after a capacitor body is sintered, a portion thereof connecting the active region and the cover may be cracked due to stress that occurs due to the difference in sintering properties.

SUMMARY

An aspect of the present disclosure provides a ceramic composition capable of reducing a degradation in reliability due to an occurrence of cracks in a portion in which an active region and a cover of a capacitor body are connected, by differentiating compositions of ceramic powder included in the active region and the cover of the capacitor body, and a multilayer capacitor having the same.

According to an aspect of the present disclosure, a ceramic composition includes a ceramic powder and a phosphor (P). The phosphor (P) has a content of 1 to 2 wt %, based on a total weight of the ceramic powder not including the phosphor (P).

According to another aspect of the present disclosure, a multilayer capacitor may include: a capacitor body having an active region including a plurality of dielectric layers and first and second internal electrodes alternately disposed with the plurality of dielectric layers interposed therebetween and respectively exposed to opposite surface of the capacitor body and cover layers disposed on upper and lower surfaces of the active region; and first and second external electrodes disposed to be electrically connected to the exposed portions of the first and second internal electrodes on the capacitor body, respectively. A phosphor (P) is included in the cover layers of the capacitor body.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
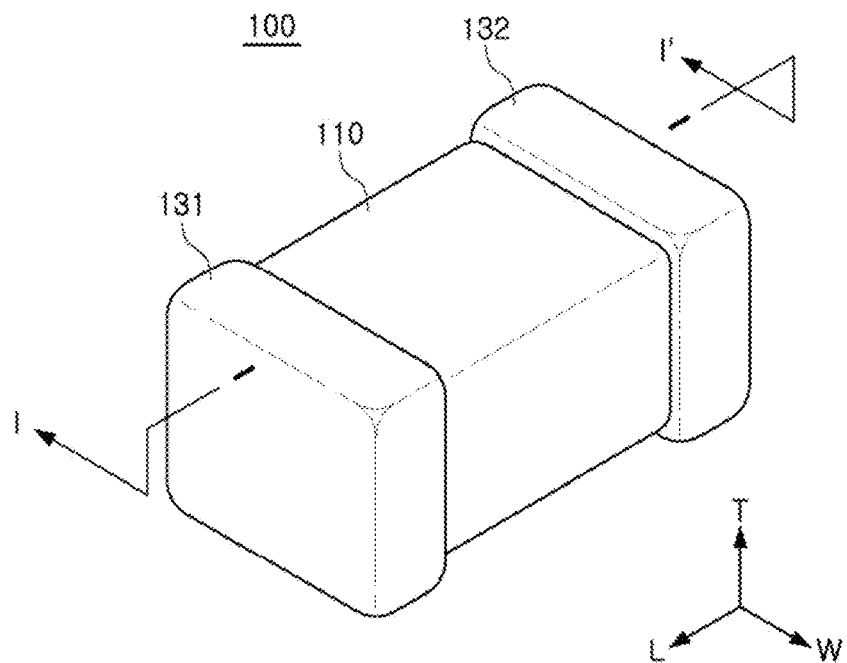
FIG. 1 is a schematic perspective view illustrating a structure of a multilayer ceramic capacitor (MLCC) according to an exemplary embodiment in the present disclosure.

Exemplary embodiments of the present disclosure will now be described in detail with reference to the accompanying drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element (s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Figure 2:
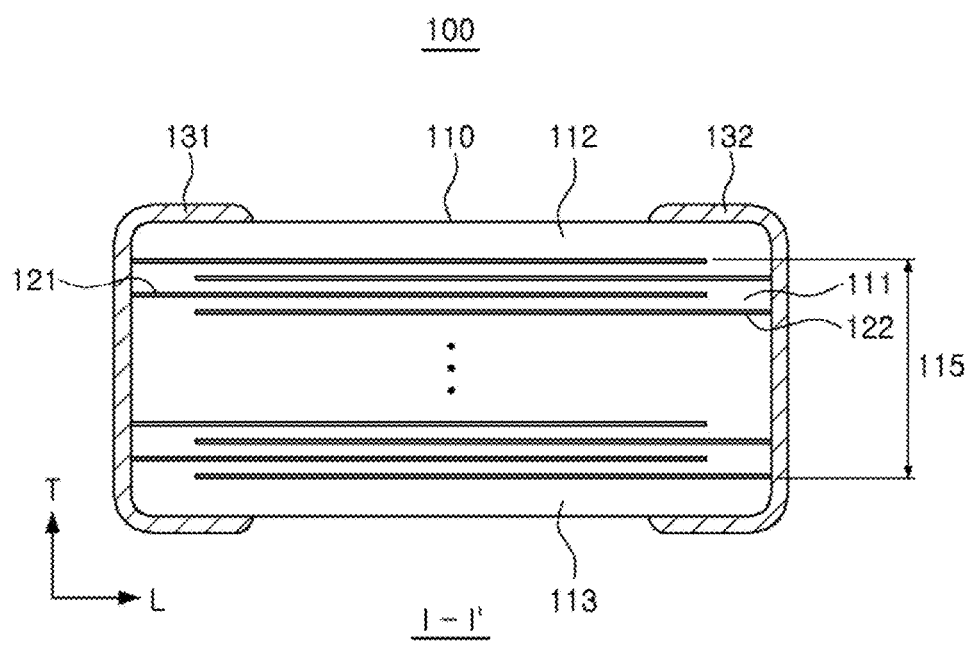
FIG. 2 is a cross-sectional view taken along line I-I' of FIG. 1.
Figure 3:
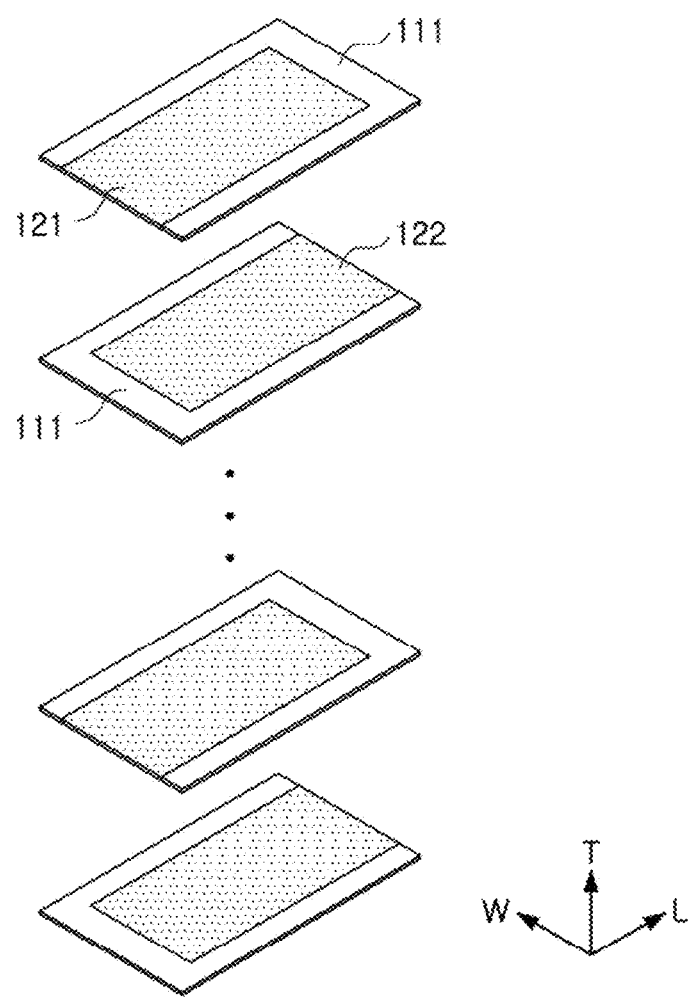
FIG. 3 is an exploded perspective view illustrating a stacking structure of internal electrodes of FIG. 1.

Referring to FIGS. 1 to 3, a multilayer ceramic capacitor (MLCC) 100 according to an exemplary embodiment includes a capacitor body 110 and first and second external electrodes 131 and 132.

For ease of explanation in describing the present exemplary embodiment, L, W, and T, defining directions of a capacitor body 110 illustrated in the drawings indicate a length direction, a width direction, and a thickness direction, respectively.

Here, the thickness direction may be a stacking direction in which dielectric layers 111 are stacked.

The capacitor body 110 is not particularly limited in terms of shape and may have a substantially hexahedral shape, for example.

In the present exemplary embodiment, for the purposes of description, surfaces of the capacitor body 110 facing each other in the thickness direction T in which dielectric layers 111 are stacked will be defined as first and second surfaces, surfaces connecting the first and second surfaces and facing each other in the length direction L will be defined as third and fourth surfaces, and surfaces perpendicular to the third and fourth surfaces and facing each other in the width direction W will be defined as fifth and sixth surfaces.

The capacitor body 110 includes an active region 115 and upper and lower cover layers 112 and 113 as margin portions.

The active region 115, apart contributing to formation of capacitance of the capacitor, includes a plurality of dielectric layers 111 and a plurality of first and second internal electrodes 121 and 122.

The active region 115 is formed by stacking the plurality of dielectric layers 111 and the first and second internal electrodes 121 and 122 in the thickness direction T in such a manner that the first and second internal electrodes 121 and 122 are alternately disposed with the dielectric layers 111 interposed therebetween, and sintering the stacked body.

Here, the plurality of dielectric layers 111 in a sintered state may be integrated, such that boundaries therebetween may not be readily apparent without using a scanning electron microscope (SEM).

The dielectric layer 111 may include a high-K ceramic material, for example, $BaTiO_3$-based ceramic powder, or the like. However, the present disclosure is not limited thereto.

The $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, and the like, obtained by partially employing calcium (Ca) or zirconium (Zr) in $BaTiO_3$, but the present disclosure is not limited thereto.

Also, the dielectric layers 111 may further include at least one of a ceramic additive, an organic solvent, a plasticizer, a binder, and a dispersant.

Here, as the ceramic additive, a transition metal oxide or carbide, rare earth elements, magnesium (Mg), aluminum (Al), and the like, may be used.

Furthermore, a phosphor (P) is not included in the dielectric layer 111 of the active region 115.

The first and second internal electrodes 121 and 122, having different polarities, may be disposed to face each other and electrically insulated from each other by the dielectric layer 111 disposed therebetween.

First ends of the first and second internal electrodes 121 and 122 may be exposed from the third and fourth surfaces of the capacitor body 110 in the length direction, respectively.

Also, the end portions of the first and second internal electrodes 121 and 122 exposed from the third and fourth surfaces of the capacitor body 110 in the length direction may be electrically connected to the first and second external electrodes 131 and 132 on the third and fourth surfaces of the capacitor body 110 in the length direction, respectively.

According to the above-mentioned configuration, when a voltage is applied to the first and second external electrodes 131 and 132, electrical charges accumulate between the first and second internal electrodes 121 and 122 facing each other, and here, capacitance of the multilayer capacitor 100 is proportional to an area of overlap of the first and second internal electrodes 121 and 122 overlapping each other in the direction in which the dielectric layers 111 are stacked.

Also, the first and second internal electrodes 121 and 122 are formed of a conductive metal, and in this exemplary embodiment, the first and second internal electrodes 121 and 122 may be formed of nickel (Ni) or a nickel alloy, but the present disclosure is not limited thereto.

In order to print the conductive metal, a screen printing method or a Gravure printing method may be used, but the present disclosure is not limited thereto.

The cover includes the upper cover layer 112 and the lower cover layer 113.

In the drawings, the upper cover layer 112 is a portion disposed on an upper surface of the first internal electrode 121 disposed in the uppermost portion of the active region 115 and having a thickness, and the lower cover layer 113 is a portion disposed on a lower surface of the second internal electrode 122 disposed in the lowermost portion of the active region 115 and having a thickness.

The upper cover layer 112 and the lower cover layer 113 may include ceramic powder similar to that of the dielectric layer 111 included in the active region 115, for example, but a material further including the phosphor (P) in the ceramic power is used as a material of the upper cover layer 112 and the lower cover layer 113.

That is, the upper cover layer 112 and the lower cover layer 113, dielectric layers on which internal electrodes are not disposed, may be formed by stacking at least one dielectric layer further including the phosphor (P) component in upper and lower portions of the active region 115 of the capacitor body 110.

The upper cover layer 112 and the lower cover layer 113 may include 1 to 2 wt % of the phosphor (P), based on a total weight of the ceramic powder not including the phosphor (P).

If the content of the phosphor (P) is less than 1 wt % or exceeds 2 wt %, a crack generation rate in the portion connecting the active region 115 and the upper and lower cover layers 112 and 113 of the capacitor body 110 may increase.

The ceramic powder may be, for example, a $BaTiO_3$-based ceramic powder, but the present disclosure is not limited thereto.

The first and second external electrodes 131 and 132 are disposed on the third and fourth surfaces of the capacitor body 110 in the length direction, respectively, and are in contact with exposed portions of the first and second internal electrodes 121 and 122 so as to be electrically connected thereto, respectively.

Here, the first and second external electrodes 131 and 132 may extend to portions of the first and second surfaces of the capacitor body 110 in the thickness direction.

Also, if necessary, the first and second external electrodes 131 and 132 may extend to portions of the fifth and sixth surfaces of the capacitor body 110 in the width direction to enhance adhesion strength with respect to the capacitor body 110.

The first and second external electrodes 131 and 132 may be formed of conductive paste including a conductive metal.

The conductive metal may be nickel (Ni), copper (Cu), palladium (Pd), gold (Au), or alloys thereof, but the present disclosure is not limited thereto.

A plated layer (not shown) formed of nickel (Ni) or tin (Sn) may be formed on the first and second external electrodes 131 and 132, if necessary.

Method for Manufacturing Multilayer Capacitor

Hereinafter, a method for manufacturing a multilayer capacitor according to an exemplary embodiment in the present disclosure will be described.

First, a plurality of first ceramic sheets are prepared.

The first ceramic sheets serve to form dielectric layers 111 included in the active region 115 of the capacitor body 110.

The first ceramic sheets may be fabricated as sheets, each having a thickness of a few micrometers (μm) by mixing a ceramic powder, a polymer, a solvent, and the like, to prepare a slurry, applying the slurry to a carrier film through a doctor blade method, or the like, and drying the same.

Next, a conductive paste including a conductive powder such as nickel, or the like, is printed to have a thickness on at least one surface of each of the first ceramic sheets to form first and second internal electrodes 121 and 122.

The first and second internal electrodes 121 and 122 may be formed to be respectively exposed to opposite surfaces of the first ceramic sheet in the length direction.

As a method for printing the conductive paste, a screen printing method, a gravure printing method, and the like, may be used, but the present disclosure is not limited thereto.

Thereafter, the plurality of first ceramic sheets each having the first and second internal electrodes 121 and 122 formed thereon are stacked in such a manner that the first and second internal electrodes 121 and 122 are disposed to face each other with the first ceramic sheet interposed therebetween.

Thereafter, second ceramic sheets are disposed on upper and lower surfaces thereof and pressurized to prepare a stacked body.

Here, the second ceramic sheets may be fabricated as sheets each having a thickness of a few micrometers (μm) by mixing the ceramic powder, the polymer, the solvent, and the like, of the first ceramic sheet, and additionally, the phosphor (P), to prepare a slurry, applying the slurry to a carrier film through a doctor blade method, or the like, and drying the same.

Here, the phosphor (P) may be contained in an amount of 1 to 2 wt %, based on a total weight of the ceramic powder not including the phosphor (P).

Thereafter, the stacked body is cut in each region thereof corresponding to one capacitor to forma chip, and the chip is sintered at high temperature to prepare a capacitor body 110 having first and second surfaces facing each other in a thickness direction, third and fourth surfaces in a length direction to which the first and second internal electrodes 121 and 122 are alternately exposed, and fifth and sixth surfaces in a width direction.

Here, sintering may be performed under an atmosphere of a temperature of 1,100° C. and a hydrogen concentration of 0.45%, but the present disclosure is not limited thereto.

Thereafter, first and second external electrodes 131 and 132 are formed using conductive paste in such a manner that the first and second external electrodes 131 and 132 are electrically connected to portions of the first and second internal electrodes 121 and 122 respectively exposed to the third and fourth surfaces of the capacitor body 110 in the length direction.

Here, the first and second external electrodes 131 and 132 may be formed through a method such as dipping or rolling, but the present disclosure is not limited thereto.

Thereafter, the stacked body is sintered to complete a multilayer capacitor 100.

Figure 7:
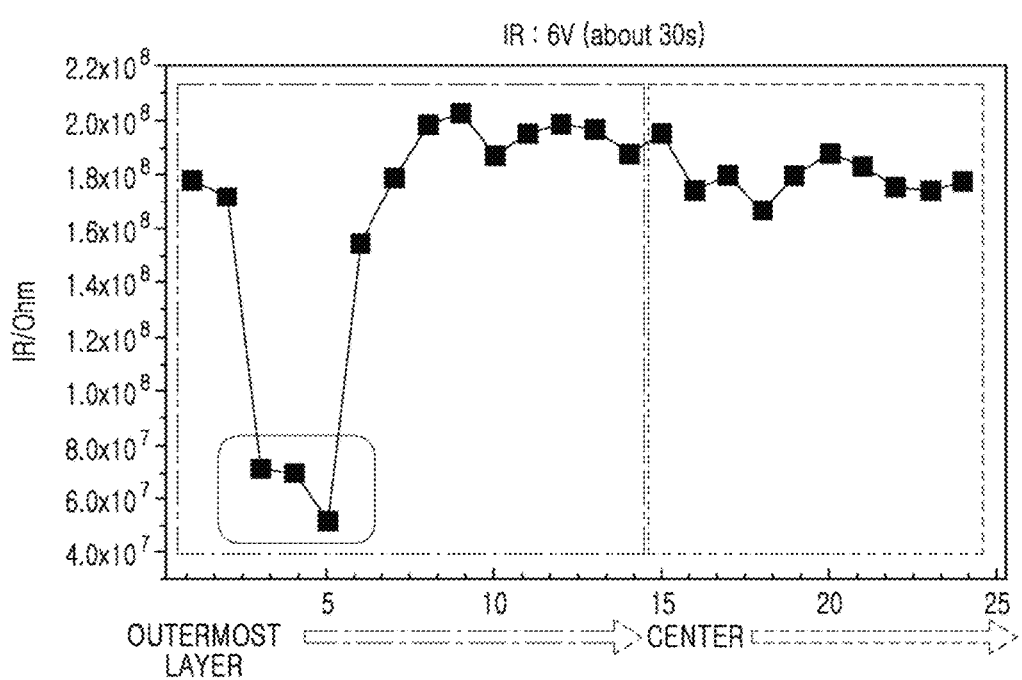
FIG. 7 is a graph illustrating IR defect analysis results using a probe workstation.

As illustrated in FIG. 7, insulation resistance (IR) was measured under conditions of an applied voltage of 6V and a charge time of 30 seconds and IR and a degradation position of a multilayer capacitor were analyzed. It can be seen that insulation properties (or IR) of the multilayer capacitor has some connection with frequency of pores in a cover of a capacitor body. Here, the pores indicate a gap between dielectric materials.

Referring to FIG. 7, it can be seen that IR was rarely degraded in an active region (central portion) of the capacitor body but IR was drastically degraded in the cover (outermost layer) of the capacitor body.

Figure 4:
FIGS. 4 to 6 are photographs illustrating a position of a generated pore in a ×50 magnification image of an MLCC after a CAF analysis.
Figure 5:
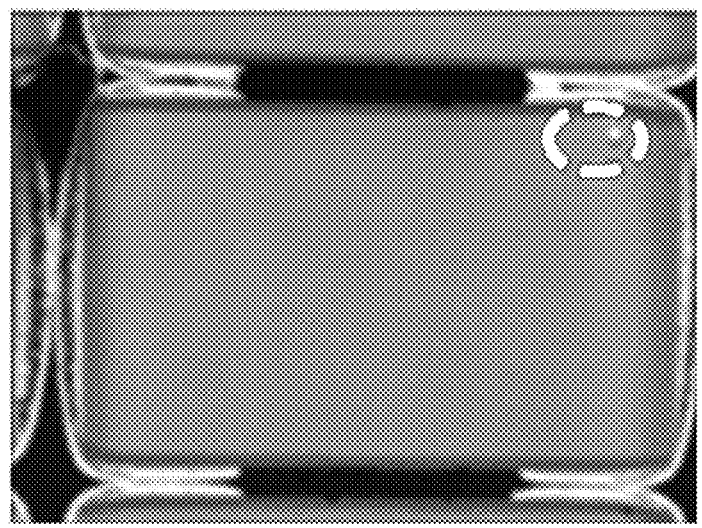
Figure 6:
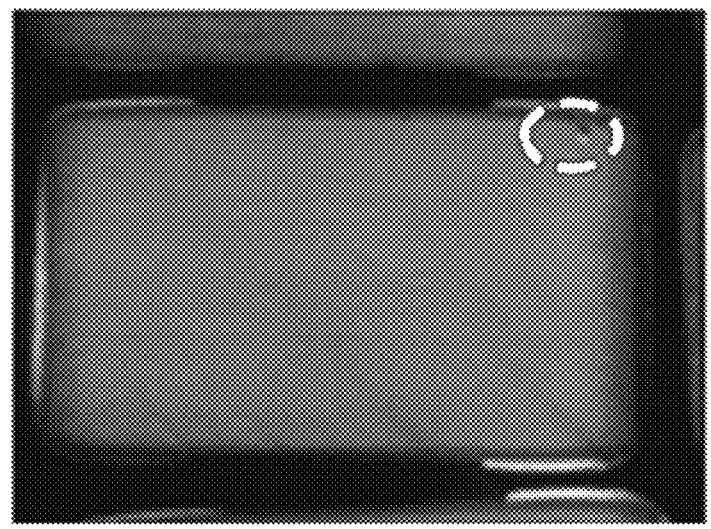

Referring to FIGS. 4 to 6, it can be seen that the pores (please refer to the red circles in FIGS. 4 to 6) are largely generated in the cover (outermost layer) of the capacitor body. Thus, it may be presumed that the portion of the capacitor in which IR is drastically degraded is a position in which a pore is generated, that is, a position in which the capacitor body is degraded.

Figure 8:
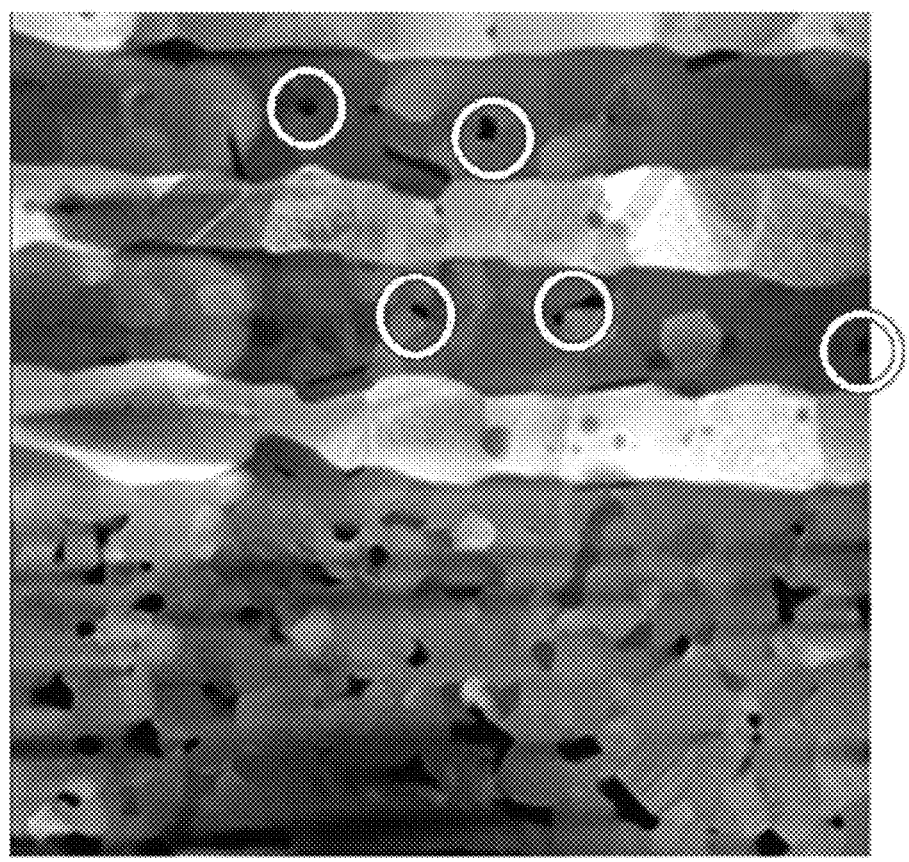
FIGS. 8 and 9 are SEM photographs illustrating poor reliability according to magnitudes of IR of capacitors.
Figure 9:
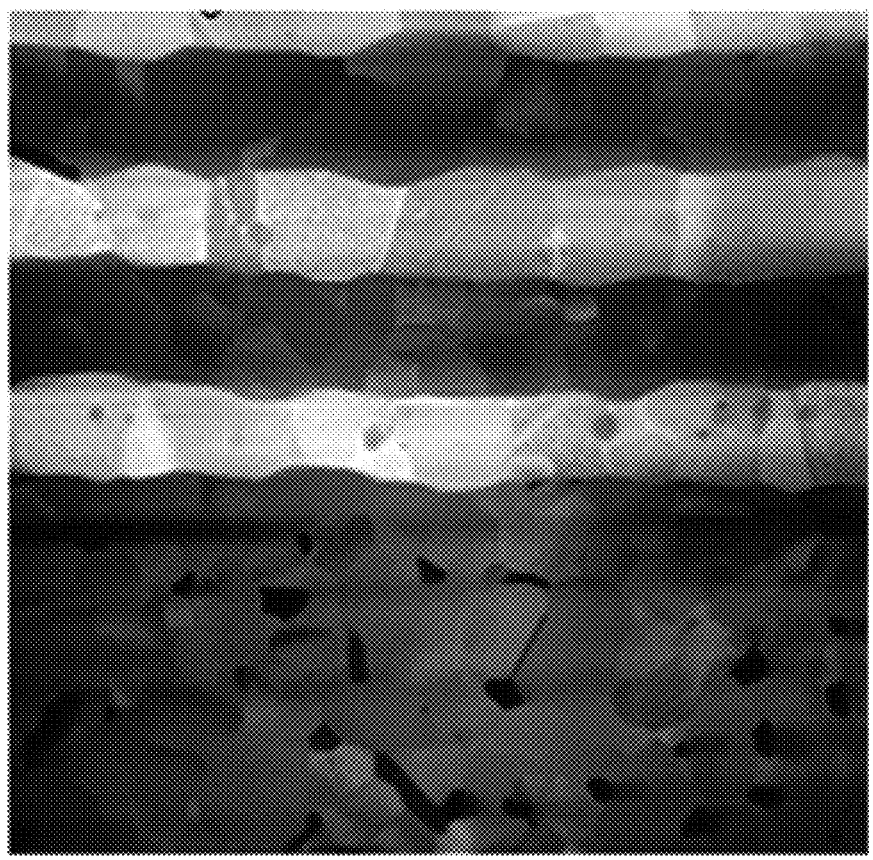

FIGS. 8 and 9 are SEM photographs illustrating poor reliability according to a magnitude of IR of a capacitor.

Here, FIG. 8 is an SEM photograph in which a portion of a multilayer capacitor with low IR in which dielectric layers and internal electrodes are stacked is enlarged, and FIG. 9 is an SEM photograph in which a portion of a multilayer capacitor with high IR in which dielectric layers and internal electrodes are stacked is enlarged.

The multilayer capacitor of FIG. 8 may be set to have IR of $10^7$ ohm, and the multilayer capacitor of FIG. 9 may be set to have IR of $10^8$ ohm.

Referring to FIGS. 8 and 9, it can be seen that fewer pores were generated in the capacitor with high IR than in the capacitor with low IR. A capacitor is considered to have excellent reliability if it has high IR.

Figure 10:
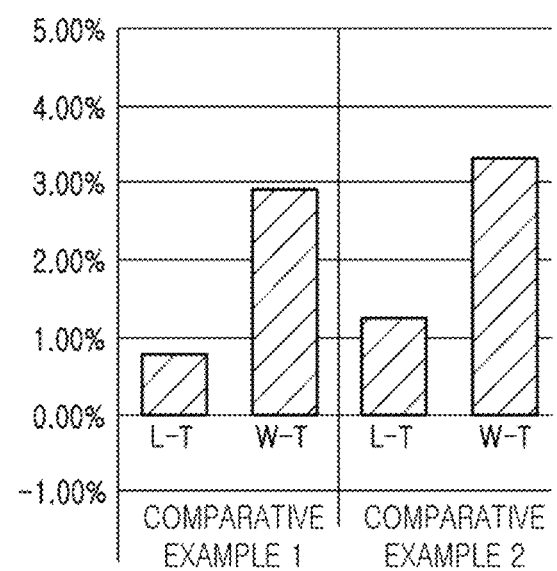
FIG. 10 is a graph illustrating ratios of widths and lengths of an upper cover and a lower cover to a width and a length of an active region of a capacitor body in a related art multilayer capacitor.

FIG. 10 is a graph illustrating ratios of lengths of upper and lower cover layers to a length of an active region of a capacitor body in a related art multilayer capacitor (which does not include the phosphor (P) in a cover thereof).

Here, Comparative Examples 1 and 2 are multilayer capacitors having a size of 0.5 mm*1.0 mm in width and length and different stacking numbers.

Referring to FIG. 10, as for the multilayer capacitor of Comparative Example 1, when a capacitor body thereof is viewed in a length-thickness direction, lengths of upper and lower cover layers of the capacitor body are greater by about 0.80% than a length of an active region.

In Comparative Example 1, when the capacitor body is viewed in a width-thickness direction, widths of the upper and lower cover layers of the capacitor body are greater than a width of the active region by about 2.93%.

As for the multilayer capacitor of Comparative Example 2, when a capacitor body thereof is viewed in a length-thickness direction, lengths of upper and lower cover layers of the capacitor body are greater by about 1.25% than a length of an active region.

In Comparative Example 2, when the capacitor body is viewed in a width-thickness direction, widths of the upper and lower cover layers of the capacitor body are greater than a width of the active region by about 3.30%.

That is, in the related art multilayer capacitor, the lengths of the upper and lower cover layers of the capacitor body are greater than the length of the active region and the widths of the upper and lower cover layers of the capacitor body are greater than the width of the active region, regardless of thickness, and here, a shrinkage rate of the active region is greater than a shrinkage rate of the length of the active region.

This is due to a difference in sintering properties between the active region and the upper and lower cover layers during a sintering process after the stacked body is prepared when manufacturing the multilayer capacitor.

Thus, when it is considered that connectivity of internal electrodes is 90% or greater according to the aforementioned phenomenon, cracks may occur with a frequency of about 10% in the portion of the capacitor body in which the active region and the upper and lower cover layers are connected.

In contrast, in the present exemplary embodiment, the upper cover layer 112 and the lower cover layer 113 include the phosphor (P), and the phosphor (P) serves to lower the temperature at which the upper and lower cover layers start to be sintered, to a maximum level during a process of sintering the capacitor body.

That is, an action of the phosphor (P) may suppress shrinkage of the upper and lower cover layers at the highest temperatures, and thus grain growth of the ceramic powder included in the cover may be accelerated at the same sintering temperature.

Thus, a difference between the lengths of the upper and lower cover layers and the length of the active region of the capacitor body and a difference between the widths of the upper and lower cover layers and the width of the active region may be minimized, and thus, the frequency of cracks occurring in the portion in which the active region and the upper and lower cover layers are connected in the capacitor body may be lowered.

Table 1 below shows measured density, hardness, a ratio of widths of upper and lower cover layers to a width of an active region, and a crack rate in a portion in which the active region and the cover layers are connected, in a multilayer capacitor manufactured through the aforementioned method and the content of the phosphor (P) of a dielectric layer applied to the cover with respect to ceramic powder was adjusted.

Here, the density was calculated by measuring weight in a 4-digit electric scale, the length-width-thickness were measured up to four decimal places by micrometer so as to be calculated, and hardness was measured by an apparatus for measuring hardness.

As the width of the active region, widths of upper and lower front ends of the active region were measured, and as the widths of the cover layers, widths of upper and lower front ends of the cover layers were measured.

The crack rate was obtained by randomly selecting 500 samples of each multilayer, observing the selected samples with an optical microscope, counting the number of samples with cracks, and indicating the counted number as a percentage.

Meanwhile, a phosphate ester may be further added to the dielectric layer applied to the cover as necessary in order to evenly disperse the phosphor.

TABLE 1

| No. | Content (wt %) of phosphor as a percentage of the total weight of the ceramic powder not including the phosphor | Density | Hardness | Ratio (%) of difference in widths of upper and lower cover layers to width of active region | Crack rate (%) in potion where active region and cover layers are connected |
|---|---|---|---|---|---|
| 1 | — | 5.6 | 5.8 | 2.93 | 10.3 |
| 2 | 0.3 | 5.7 | 9.4 | 2.31 | 9.2 |
| 3 | 0.6 | 5.7 | 7.4 | 2.52 | 7.5 |
| 4 | 0.8 | 5.8 | 8.0 | 1.70 | 6.2 |
| 5 | 1.0 | 5.8 | 8.2 | 1.45 | 5.1 |
| 6 | 1.5 | 5.9 | 15.1 | 0.68 | 2.3 |
| 7 | 2.0 | 5.8 | 11.3 | 1.21 | 4.2 |
| 8 | 2.2 | 5.8 | 11.1 | 1.43 | 5.1 |
| 9 | 2.4 | 5.8 | 10.6 | 1.76 | 5.3 |

Referring to Table 1, density and hardness are maximized in sample 6 in which the content of the phosphor (P) as a percentage of the total weight of the ceramic powder not including the phosphor (P) is 1.5 wt %, which means that sintering properties of the dielectric layer of the cover is maximized.

That is, in the case of sample 6, a ratio (%) of the difference in the widths of upper and lower cover layers to the width of the active region is smallest at 0.65%, and accordingly, it can be seen that the crack rate is the smallest at 2.3% in the portion where the active region and the cover are connected.

In samples 1 to 4 and 8 to 9 in which the content of the phosphor (P) is less than 1.0 wt % or exceeds 2.0 wt %, based on a total weight of the ceramic powder not including the phosphor (P), it can be seen that sintering properties of the dielectric layer of the cover is reduced while a ratio of the upper and lower cover layers to the width of the active region is increased, and thus, the crack rate is drastically increased again.

As set forth above, according to exemplary embodiments in the present disclosure, since the cover of the capacitor body is formed of a ceramic composition including the phosphor (P) that increases grain growth of the ceramic component included in the cover when the capacitor body is sintered, thus controlling a difference in shrinkage between the active region and the cover of the capacitor body, occurrence of cracks in the portion where the active region and the cover are connected is suppressed, thereby improving the reliability of the multilayer capacitor.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a capacitor body having an active region including a plurality of dielectric layers and first and second internal electrodes alternately disposed with the plurality of dielectric layers interposed therebetween and respectively exposed to opposite surfaces of the capacitor body and cover layers disposed on upper and lower surfaces of the active region; and
first and second external electrodes electrically connected to the exposed portions of the first and second internal electrodes on the capacitor body, respectively,
wherein a phosphor (P) is dispersed among a non-phosphor material in the cover layers of the capacitor body, and
wherein at least one of the uppermost internal electrode and the lowermost internal electrode, from among the alternately disposed first and second internal electrodes, has a first surface directly contacting a cover layer having the phosphor (P) dispersed therein and a second surface opposing the first surface and directly contacting a dielectric layer of the plurality of dielectric layers that does not include the phosphor (P).

2. The multilayer capacitor of claim 1, wherein the active region does not include the phosphor (P).

3. The multilayer capacitor of claim 1, wherein the cover layers of the capacitor body include 1 to 2 wt % of the phosphor (P), based on a total weight of a ceramic powder of the cover layers not including the phosphor (P).

4. The multilayer capacitor of claim 3, wherein the ceramic powder includes $BaTiO_3$.

5. The multilayer capacitor of claim 1, wherein a ratio of a difference in widths of the upper and lower cover layers to a width of the active region is less than 1.5%.

6. The multilayer capacitor of claim 1, wherein the cover layers having the phosphor (P) dispersed therein are disposed on an upper surface of an uppermost internal electrode in the capacitor body and on a lower surface of a lowermost internal electrode in the capacitor body.

7. The multilayer capacitor of claim 1, wherein the phosphor (P) is dispersed among a ceramic-containing material of the cover layers of the capacitor body.

8. The multilayer capacitor of claim 1, wherein the first and second external electrodes extend onto and contact the cover layers having the phosphor (P) dispersed therein.

9. The multilayer capacitor of claim 1, wherein the cover layers having the phosphor (P) dispersed therein each directly contact at least one internal electrode of the capacitor body.

10. The multilayer capacitor of claim 1, wherein the phosphor (P) is dispersed throughout a region of the cover layers overlapping with the first and second internal electrodes in a stacking direction of the first and second internal electrodes.

11. The multilayer capacitor of claim 1, wherein the cover layers include a same dielectric material as the plurality of dielectric layers of the capacitor body, and the phosphor (P) is dispersed among the dielectric material in the cover layers.

* * * * *